United States Patent [19]
Paton

[11] Patent Number: 4,516,506
[45] Date of Patent: May 14, 1985

[54] ARTICULATED INTERMODAL FLATCAR

[76] Inventor: H. Neil Paton, 1218 Third Ave., Suite 1022, Seattle, Wash. 98101

[21] Appl. No.: 283,007

[22] Filed: Jul. 13, 1981

[51] Int. Cl.³ .......................... B23P 6/00; B61D 3/12; B61D 17/04
[52] U.S. Cl. ...................... 105/3; 29/401.1; 29/416; 105/4 R; 105/416; 410/57
[58] Field of Search ...................... 29/401.1, 412, 416, 29/525; 105/3, 4 R, 416, 168; 410/1, 3, 52, 54, 57, 86, 88

[56] References Cited

U.S. PATENT DOCUMENTS

| | | | |
|---|---|---|---|
| 2,816,794 | 12/1957 | Temp | 29/401.1 |
| 2,920,580 | 1/1960 | Williams | 105/4 R X |
| 2,992,621 | 7/1961 | Schoen | 410/1 |
| 3,102,497 | 9/1963 | Candlin, Jr. et al. | 410/57 |
| 3,143,082 | 8/1964 | Austgen | 410/88 |
| 3,251,314 | 5/1966 | Gutridge | 410/86 |
| 3,260,223 | 7/1966 | Black et al. | 410/52 |
| 3,309,759 | 3/1967 | Vittone | 29/401.1 |
| 3,348,502 | 10/1967 | Burns et al. | 410/1 |
| 3,357,371 | 12/1967 | Gutridge | 410/54 |
| 3,475,809 | 11/1969 | Brown | 29/412 |
| 3,479,724 | 11/1969 | Kruizenga et al. | 29/525 |
| 3,487,532 | 1/1970 | Phillips | 29/416 X |
| 3,509,829 | 5/1970 | Henricksson et al. | 105/4 R |
| 3,557,708 | 1/1971 | Bolte | 105/4 R |
| 3,568,607 | 3/1971 | Gutridge | 410/54 |
| 3,854,423 | 12/1974 | Bridge | 410/54 |
| 3,961,582 | 6/1976 | Paton et al. | 105/168 X |
| 4,099,313 | 7/1978 | Phillips | 29/401.1 |
| 4,191,107 | 3/1980 | Ferris et al. | 105/4 R |
| 4,231,144 | 11/1980 | Bernacchia, Jr. | 29/401.1 |
| 4,233,909 | 11/1980 | Adams et al. | 105/4 R |
| 4,274,776 | 1/1981 | Paton et al. | 410/3 |
| 4,339,996 | 7/1982 | Brodeur et al. | 105/3 |
| 4,356,775 | 11/1982 | Paton et al. | 105/3 X |

Primary Examiner—Howard Beltran
Attorney, Agent, or Firm—Finnegan, Henderson, Farabow, Garrett & Dunner

[57] ABSTRACT

The flatcar is made up of multiple articulated units fabricated from severed portions of conventional 85 foot or 89 foot flatcars. These units may be supported by double axle trucks salvaged from the original 85 foot or 89 foot flatcars, or by new single axle trucks having new or salvaged components. Portions of the deck and center beam are removed in order to lighten each unit, but without exceeding the stability limits of the original car beam structure.

30 Claims, 11 Drawing Figures

FIG. 6

1. HITCH LEFT INTACT (WHERE REQUIRED).
2. COUPLER ASSEMBLY LEFT INTACT.
3. TRUCKS REMOVED OF WHEELS, AXLES, BEARINGS AND BRAKE COMPONENTS SALVAGED.
4. STRUCTURE REMOVED FOR TRUCK AND AXLE CLEARANCE AND MODIFIED TO ACCEPT DRAWBAR ASSEMBLY (EXTENSION ADDED TO TRAILING CAR).
5. SINGLE AXLE TRUCKS MOUNTED TO STRUCTURE ALONG WITH REUSED WHEELS, AXLES, BEARINGS AND BRAKE COMPONENTS.
6. DRAWBAR ASSEMBLY ADDED.
7. HITCH RELOCATED (WHERE REQUIRED).

1. TRUCKS, COUPLER ASSEMBLY, HITCHES LEFT INTACT.
2. TRUCKS, COUPLER ASSEMBLY LEFT INTACT.
3. TRUCKS REMOVED AND REUSED IN NEW LOCATIONS WITH ARTICULATED CONNECTORS INSTEAD OF COUPLER ASSEMBLIES.
4. HITCHES RELOCATED.
5. STRUCTURE REMOVED FOR TRUCK AND AXLE CLEARANCE AND EXTENSIONS MODIFIED TO ADAPT TO ARTICULATED CONNECTOR.

ARTICULATED INTERMODAL FLATCAR

BACKGROUND OF THE INVENTION

This invention relates to railcars and, more particularly, to so-called "intermodal" flatcars which are used to carry containers, trailers, or both.

Figure 10:
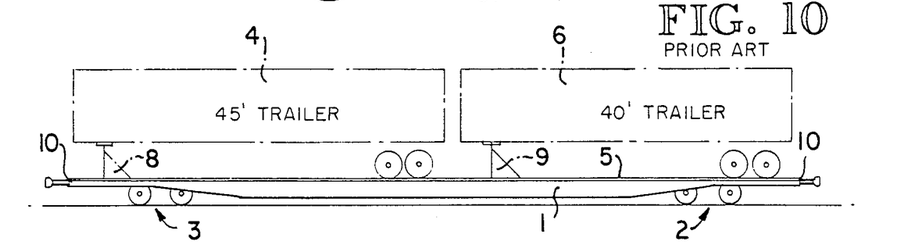
FIG. 10 is a side elevational view of an existing intermodal flatcar.

As a result of increasing fuel costs and other factors, the shipping and trucking industries are resorting to the use of more economical 45 foot containers and 45 foot trailers and are, in some instances, considering replacement of entire fleets of conventional 40 foot trailers. However, the typical intermodal flatcar, which is either 85 feet or 89 feet in length over end sills, cannot readily carry two 45 foot containers or trailers economically. More specifically, an 89 foot flatcar can carry only one 40 foot trailer and one 45 foot trailer simulataneously, as depicted in FIG. 10. With this equipment, therefore, the railroad must carry an equal mix of 40 and 45 foot trailers on its 89 foot flatcars, and either a single 45 foot trailer or two 40 foot trailers on its 85 foot flatcars, and similarily for containers. However, the increasing number of 45 foot trailers in use or entering use often makes it difficult or impossible to obtain an economical mix of 40 and 45 foot trailers at the time a train is made up. As a consequence, the railroad often makes up the train with several 85 or 89 foot flatcars each carrying only a single 45 foot trailer. This results in several economic penalties, among which are: unused load carrying capacity of the available equipment; reduced net/tare ratio; and increased maintenance-of-way per net ton and fuel costs due to the low net-to-tare weight ratio and aerodynamic drag created by the gap between trailers on adjacent flatcars.

Accordingly, there is an urgent need for an intermodal flatcar that can carry 45 foot, or larger, trailers or containers economically. The railroad industry, however, is in a dilemma since it cannot afford to scrap its current fleet of approximately 60,000 intermodal flatcars in favor of buying new equipment designed specifically for 45 foot trailers. Further, since many of these flatcars still possess substantial useful life, the railroad industry is reluctant to invest substantial sums in new equipment until the useful life of its current equipment approaches an end.

Figure 11:
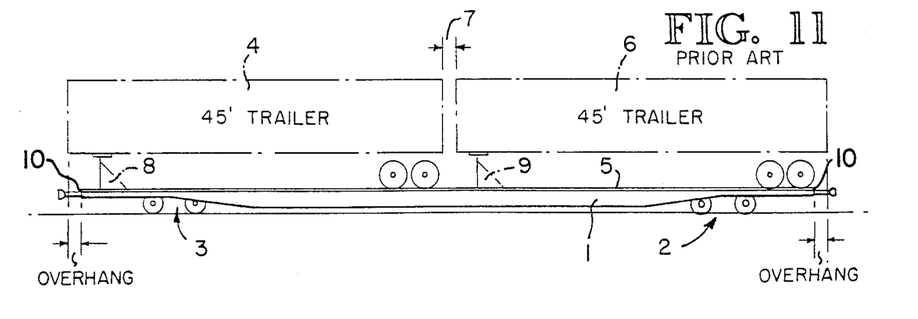
FIG. 11 is a side elevational view generally similar to FIG. 10, depicting the hitches relocated for 45 foot trailers.

Modification or retrofitting of existing intermodal flatcars to make them more economical has not been satisfactory, relocating container pedestals, or the trailer hitches, so as to accept two 45 foot trailers is not desirable because typical 45 foot trailers may overhang the strikers, as depicted in FIG. 11. Likewise, it would not be possible to carry two 45 foot trailers having nose refrigeration units due to the lack of sufficient clearance between these units and the rear of the preceeding trailer. Further, no reduction in net/tare ratio would be obtained, and extra handling costs would be incurred because of more precise trailer positioning.

Another such modification is aimed at reducing the weight of the standard 85 foot or 89 foot flatcar simply by removing portions of the deck structure. This has been found to be impractical because the original beam strength of the flatcar would be weakened excessively. In a typical 89 foot flatcar, for example, the loss of deck structure, which tends to act as a beam flange to the center beam, would overload the remaining center beam structure such that it could not withstand the combined loads as defined in paragraph 4.2.2.7 in Section C-II of the AAR Manual, (1.8 times vertical dead load, live load and draft load; and 1.5 times lateral load). In this case the maximum compressive stress level in the typical center beam would be approximately 96,000 psi, far above its material yield strength of either 46,500 or 50,000 psi, depending upon the type and thicknesses of steel used.

The extreme length of the existing intermodal flatcars also mitigates against their continued use. Beam deflection problems require that many such flatcars be "starred" or down rated at a load carrying capacity which is from 2,000 to 27,000 pounds less than their actual AAR determined carrying capacity. This is in large part due to lack of rail clearance when the beam structure is at maximum deflection, or on vertical curves. These cars also suffer from operational drawbacks in that they have difficulty negotiating curves, a condition also causing severe derailment problems when run empty, especially at the head end of the train.

SUMMARY OF THE INVENTION

This invention provides a railcar capable of overcoming these and other problems associated with prior intermodal flatcars while transforming existing intermodal flatcars into articulated intermodal flatcars adapted to carry 45 foot, or longer, trailers, containers, or both. In some cases, intermodal flatcars, according to this invention, can be obtained at a cost of only about 50% of that which would be required to manufacture a new intermodal railcar of corresponding net-to-tare load carrying capacity. Although the present invention will be described with respect to intermodal flatcars, it will be understood that, in its broadest scope, the invention may be applied to other types of railcars wherein the problems and shortcomings discussed, now or may, exist.

The articulated railcar of this invention includes at least two units. These units are formed by severing one or more non-articulated railcars and connecting the units together so that one unit may swivel with respect to the other when negotiating curves. Suitable trucks, whether of single axle or double axle types, are mounted to these units. For application to an articulated intermodal flatcar, this invention provides for transverse severance of an existing 85 foot, 89 foot or other type of flatcar, as the case may be, followed by removal of portions of the original flatcar structure adjacent the severed ends as required to provide clearance for the trucks. In addition, the length of one or more units thus obtained may be increased in order to accomodate trailers with nose mounted refrigeration units, or other cargo of added length, and portions of the existing deck structure may be removed to reduce tare weight, while maintaining structural strength of the severed car sections.

Unlike the prior intermodal flatcars discussed above, portions of the original deck structure which were required to resist applied loads in the original flatcar, now may be removed in this invention in order to reduce weight while maintaining beam strength. This is in part made possible by the reversal in bending moments occasioned by the articulated construction discussed above. With this invention, therefore, the critical load condition for the center beam is the combination of loads as defined in paragraph 4.2.2.7 Section C-II of the AAR Manual (1 million pound compressive end load combined with vertical dead load and lateral load) with the car unloaded, since any cargo loading would tend to relieve the compressive loading in the upper flange of the center beam. As an example, for one type of 89 foot car, the calculated maximum stress level in the center beam of this invention typically approximates 47,000 psi which is within the stability limits for this center beam.

The flatcar according to this invention thus offers weight savings which translate into significant economic advantages. For example, a two unit articulated flatcar of this invention could be about 9,000 pounds lighter than the original 89 foot TTX flatcar from which it was made. The weight reduction obtained produces significant economic benefits in the form of fuel savings and reduction in so-called "maintenance-of-way" costs (based upon rail wear and track, ballast, switches and bridge maintenance and other structures' costs).

Another advantage of this invention is that, due to the shortened center beam of each unit (corresponding to approximately one half the length of the original center beam) the beam deflection and shear loading under load are minimized. This of course means that flatcars of this invention can be loaded to increased capacity without fear that deflection in excess of practical limits will occur. Also, since bending and shear loads are minimized, the service life of the flatcar can be extended greatly beyond that which would normally be expected of an existing flatcar.

When equipped with single axle trucks, this invention offers still other advantages in that it is possible to provide a lighter weight and more effective suspension system. Existing flatcars include a heavy two-point suspension system which tends to lack stability, as will be described presently. This invention provides a flatcar with at least three and preferably four points of suspension per unit, or preferably eight points of suspension for a two unit car capable of carrying two 45 foot trailers. These suspensions exhibit far greater stability and other performance advantages not attainable with such two-point suspensions.

Thus, it will be appreciated from the foregoing summary that this invention provides an intermodal flatcar which out performs and is more economical than existing intermodal flatcars. Using this invention, it is now possible to utilize existing intermodal flatcars, increase their versatility, extend their service life, and modernize their suspensions. The current inventory of intermodal flatcars therefore may now be viewed as a valuable potential resource from which modern, energy efficient intermodal flatcars can be obtained.

These and other features, objects and advantages of the invention will become apparent with reference to the following description, claims and the drawings, wherein like parts bear like reference numerals.

DETAILED DESCRIPTION OF THE DRAWINGS

FIG. 10 illustrates a conventional 89 foot 4 inch, or 90 feet over strikers 10 intermodal flatcar for trailer and/or container hauling. This flatcar is commonly referred to by the railroad industry as an "89 foot" intermodal flatcar. The profile of a flatcar of this type is essentially that of a center beam 1 approximately 90 feet in length, supported at its ends by conventional two-axle, four wheel, three-piece trucks 2 and 3. Center beam 1 underlies and supports a car bed or deck 5 of suitable width to support trailers or containers, as the case may be. In the illustrated flatcar, the deck acts as an upper flange to the beam to resist bending loads and resultant mid-span deflection. The load carrying capacity of this flatcar therefore is "starred" in order to maintain sufficient ground clearance as previously described.

FIG. 11 depicts the situation wherein two 45 foot trailers 4 and 6 are carried on the car deck 5 nose-to-tail, but are spaced apart to provide a gap 7 of approximately 10 inches between the adjacent ends of the trailer bodies. The illustration is one of a nonconventional arrangement, having already had the trailer hitches 8 and 9 relocated on the deck from the positions ordinarily occupied as depicted in FIG. 10. It will be understood that the trailers 4 and 6 have their forward ends supported by hitches 8 and 9 of any form suitably supported on the car bed. It is well known in the art, of course, to adjust the hitches, or other means for securing either trailer or container bodies to the car bed, and the illustration is by way of example only. As can be appreciated, with an 89 foot bed, the limit capacity of the flatcar is reached by two 45 foot trailers which do not include end attachments such as nose refrigeration units. That is, this flatcar, even when modified by relocating the hitches as illustrated, cannot carry two 45 foot trailers with nose refrigeration units.

Trucks 2 and 3 provide only two points of support for center beam 1 and are adapted to swivel during curving. Each truck is mounted near one end of beam 1 on the longitudinal center line thereof by a relatively small center plate that typically is secured to body bolsters. This center plate rests upon a loosely mating center bowl, cast into the vertical load supporting structural members of each truck, or the truck bolster. This construction is well known in the art and accordingly is not illustrated in detail. Although raised contact areas are usually mounted on the upper surface of the truck bolster about midway between the center bowl and the truck side frames to prevent the carbody from actually toppling over, the carbody is normally subjected to a high degree of rocking on its center plate and center bowl supports, causing extreme dynamic instability for the entire car. In addition, trucks 2 and 3 conventionally are of a three-piece construction that tends to cause them to perform in such a manner that, when a leading wheel flange contacts a rail curve, the wheel angle of attack to rail is increased, causing a high rate of wheel flange wear and grinding down of the rail head.

Figure 1:
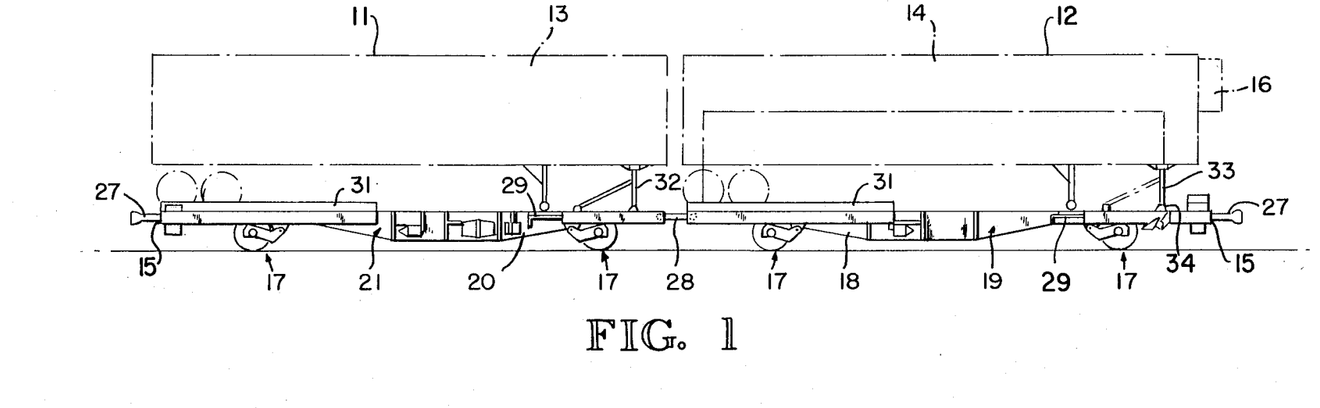
FIG. 1 is a side elevational view of a first preferred embodiment of a two unit articulated intermodal flatcar according to this invention, as adapted to carry two 45 foot trailers, one having a nose mounted refrigeration unit.
Figure 2:
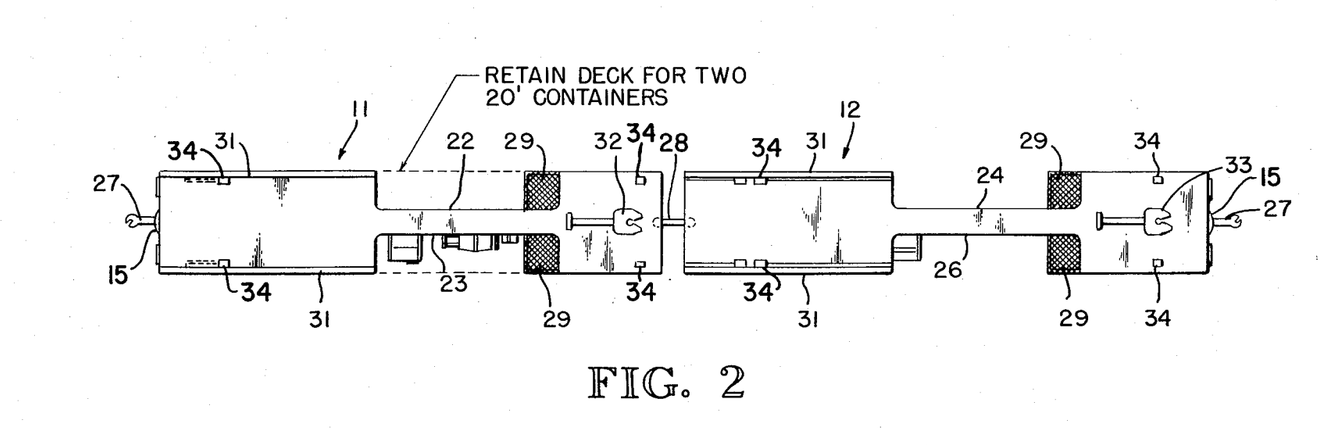
FIG. 2 is a plan view of the FIG. 1 flatcar.

Referring now to FIGS. 1–5 and 9, this invention provides an articulated intermodal flatcar which overcomes or substantially mitigates these and other problems associated with flatcars of the type just described. The flatcar illustrated in FIGS. 1 and 2 is an articulated flatcar extending approximately 94 feet over strikers 15 and is adapted to carry a first 45 foot trailer 13 and a second 45 foot trailer 14, the latter having a refrigeration unit 16 on its nose or forward end. This flatcar is fabricated from two sections obtained by severing a conventional 89 foot flatcar, such as that illustrated in FIGS. 10 and 11, one section being 44 foot 2 inches in length and the other being 45 foot 10 inches in length, including strikers 15, as will be described presently. These dimensions may vary with the particular flatcar dependent upon the intended type of lading and lading capacity for the resulting articulated car.

As will be evident from FIGS. 1 and 2, the original 89 foot bed and center beam such as bed 5 and center beam 1 in FIGS. 10 and 11, have been severed transversely to form two units, referenced by numerals 11 and 12, with shortened center beams 19 and 21. The trucks formerly at each end of the carbody have been replaced by four (in this case, identical) single axle trucks 17 located adjacent and spaced inwardly from respective ends of the units 11 and 12. Clearance for the inboard trucks mounted adjacent the severed ends of units 11 and 12 is provided by cross-sectional relief surfaces formed by tapering back portions of the center beams 19 and 21, as at 18 and 20. This tapering also serves to lighten the overall weight of the car. Further weight reduction, however, may be obtained by scarfing or removing substantial sections of the original deck 5 to form relief cuts which bound sections 22, 23, 24 and 26, as illustrated in FIG. 2. Weight reductions by removal of unnecessary deck structure are possible in the instance where trailers or containers are crane loaded and unloaded, obviating the necessity for roll-on wheel decks for the trailers. The couplers 27 remain on the leading and trailing ends of the articulated car and a drawbar 28 is connected between the center beams 19 and 21 by means of draft pins or the like and serves to connect the units 11 and 12 to form the articulated railcar. The drawbar 28 may be of any well known construction which will be undestood by those familiar with the art. Similarly if desired, the units may be interconnected by conventional couplers in place of a drawbar.

In the example shown in FIGS. 1 and 2, landing gear security pans 29 may be provided and recessed from the level of the car bed to allow loading of the trailers without retracting their landing gear. Trailer centering and wheel security rails 31 also may be provided as illustrated most clearly in FIG. 1. These trailer centering rails serve to center the wheels of the trailer on deck 5 as the trailer is lowered onto the flatcar, as well as deter theft of the trailer wheels when left unattended in the railyard or on sidings. Conventional hitches 32 and 33 are mounted on units 11 and 12 as required to provide support for the forward ends of trailers 13 and 14 respectively. It will be understood, of course, that in the event the articulated units are designed for carrying containers, any suitable form of fixed or movable pedestals or corner locators 34 may be provided as shown (FIG. 2) and hitches 32 and 33 may be of the conventional raisable type. In this example, moreover, it is possible to leave hitch 33 in its original location.

The FIG. 1 flatcar includes four single axle trucks 17 which will be understood to be identical for the eight wheels of the articulated car in the present example. Trucks 17 are mounted directly to each unit 11 and 12 to provide eight points of suspension for the flatcar illustrated, or four suspension points per unit. Since the trucks 17 are identical, only one such truck will be described in detail with reference to FIG. 9. Each truck of the preferred form includes a single axle 36 and a pair of radius arms 37 which are pivotably connected to brackets 38. These brackets are connected to a bolster (not shown) carried on the carbody. The axle 36 is journaled to the radius arm 37 in a conventional manner. Radius arm 37 is sprung in the preferred form from the railcar unit by elastomeric rod springs 39 which provide a nonlinear spring rate and, unlike steel coil springs, do not bottom or break under load. The upper surface of each elastomeric spring 39 is seated against the frame of the railcar unit which may be provided with such means as a spring platen 40. The lower surface of the spring 39 is seated against a wedge 41 which, in turn, is slidably mounted on the radius arm 37. The wedge also carries a friction shoe 42 which bears against and slides along an inclined friction damping surface 43 connected to the bracket 38 in any suitable manner.

Figure 9:
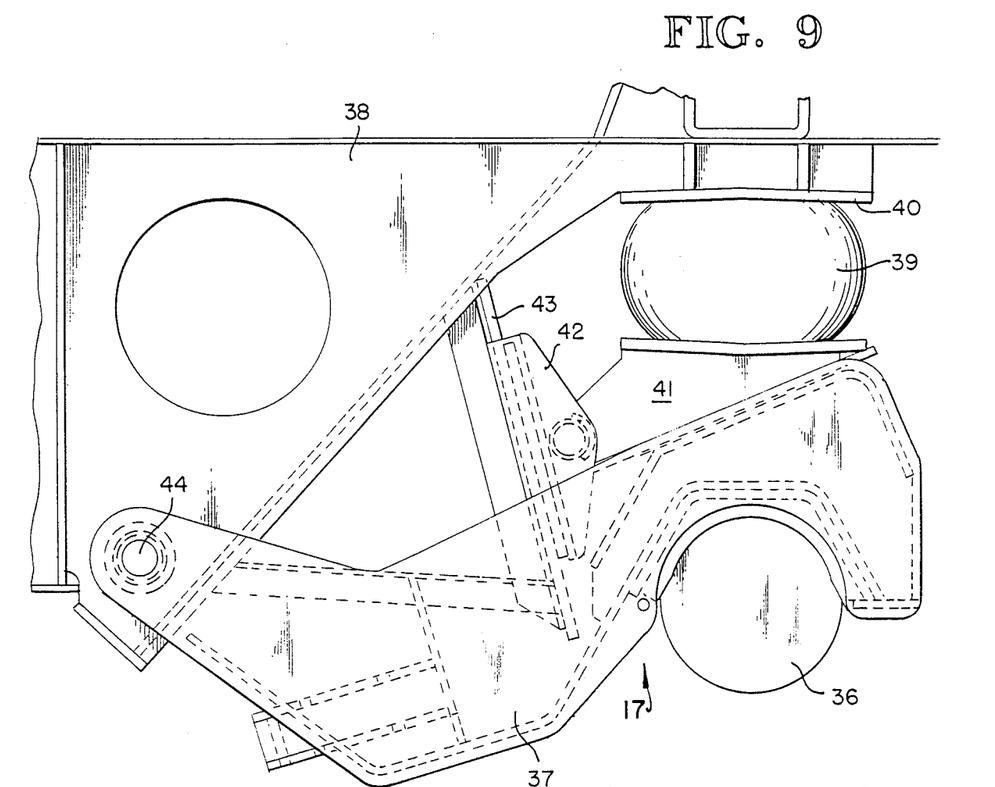
FIG. 9 is a fragmentary side elevational view, partly in section, of one preferred form of single axle truck of the FIG. 1 flatcar.

The FIG. 9 suspension is configured so that, as the applied loading increases, the spring 39 bears against the wedge member 41 with increasing force, causing it to press the friction shoe against the friction surface with increasing force. As the radius arm pivots, the wedge 41 and associated friction shoe 42 are caused to slide up and down along the friction surface 43, thus providing friction damping which varies according to the load applied to the system. At normal loads, the axle 36 is below the pivot 44 of the radius arm. As additional load is applied, however, the axle will tend to pivot up and away from the opposite end of the railcar unit. Thus, when load is transferred from the inner to the outer wheel as a result of centrifugal acceleration in a curve, the truck suspension, made up of each pair of load arms and adjoining axles, will tend to steer the outside wheels around the curve. This results in not only reduced track and wheel flange wear, but also reduces the amount of power necessary to pull the railcar around the curve. The frictional damping and eight points of suspension with full width support at each side location also reduces the tendency of the railcar to roll from side to side, a major problem with conventional trucks. The suspension just described thus improves the dynamic stability of the car as compared to that provided by the original two-point suspension system described above.

Figure 3:
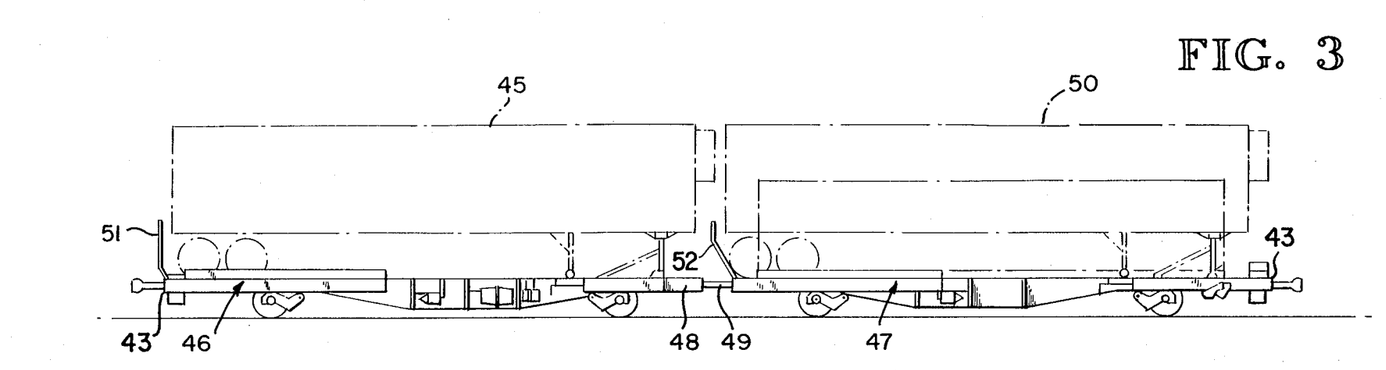
FIG. 3 is a side elevational view of an articulated intermodal flatcar generally similar to the FIG. 1 flatcar, but as adapted to carry two 45 foot trailers with nose mounted refrigeration units.
Figure 4:
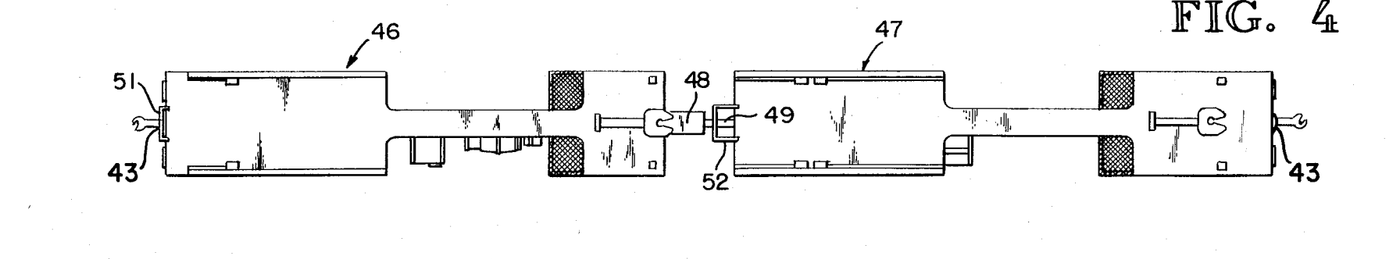
FIG. 4 is a plan view of the FIG. 3 flatcar.

The flatcar illustrated in FIGS. 3 and 4 is fabricated from a conventional 89 foot flatcar which provides a 43 foot 4 inch car unit section and a 46 foot 8 inch car unit section, including strikers 43. The articulated intermodal flatcar obtained in this example is adapted for carrying two 45 foot trailers, 45 and 50, both with nose refrigeration units. It is generally similar to the FIG. 1 and 2 flatcar, except for the addition of a 3 foot 4 inch longitudinal extension 48, which is rigidly connected to the center beam of the associated car unit. Extension 48 provides a connection point for a drawbar 49 which connects car units 46 and 47 swivelably. In addition, the FIG. 3 and 4 flatcar includes an anti-theft bar 51 for car unit 46 and an anti-theft bar 52 for car unit 47. These bars prevent opening of the trailer rear doors while the trailers are mounted on the articulated cars. These anti-theft bars may be fixedly attached to the car beds since the cars are to be side/overhead loaded.

Figure 5:
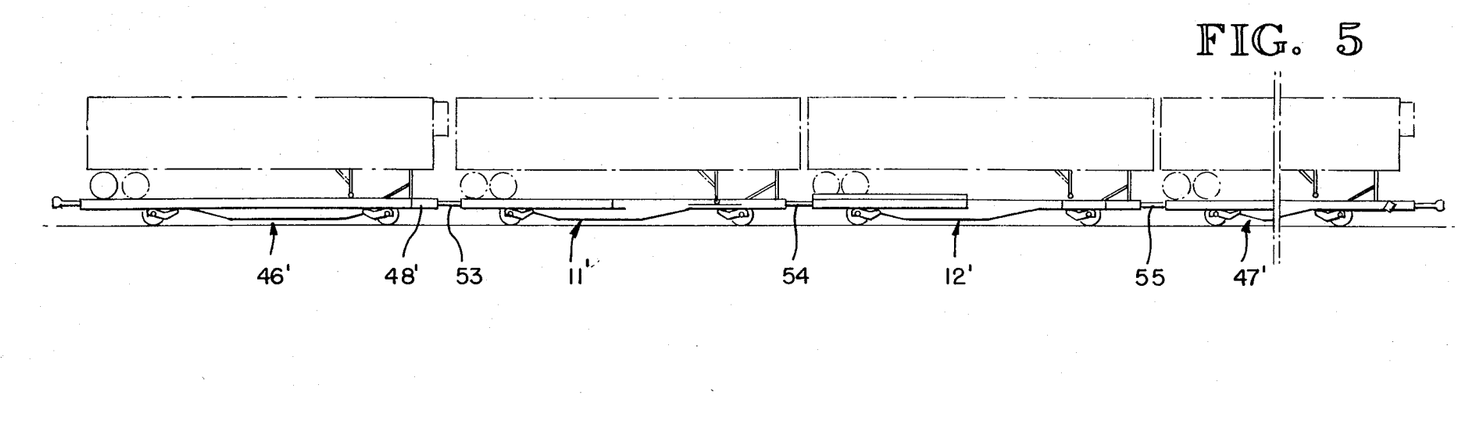
FIG. 5 is a side elevational view of a four unit articulated intermodal flatcar according to this invention, as adapted to carry four 45 foot trailers, two of which include nose mounted refrigeration units.

FIG. 5 illustrates a four unit articulated intermodal flatcar capable of carrying four 45 foot trailers with and without nose mounted refrigeration units. This flatcar is made up of units corresponding to units 46, 11 and 12 and 47 of FIGS. 1-4 as indicated by like reference numerals, primed, except that additional drawbars 53, 54 and 55 interconnect the adjacent ends of the car units, as shown. It will be recognized that the number of car units may vary, depending upon desired lading capacity, service requirements and other factors.

The method for fabricating the flatcars of FIGS. 1-5 will now be discussed with reference to FIGS. 6-8. Regardless of the dimensions of the conventional flatcar, such as that illustrated in FIG. 10, from which the flatcar of the invention is fabricated, this method, in general, may be practiced by first severing the flatcar body, whatever design it may be. The carbody including the center beam will be severed at a predetermined point to create two carbody units of dimensions suitable for the lading length desired. Once the flatcar has been severed, unnecessary portions of the deck may be removed to lighten each unit, as may end portions of the center beam or other longitudinal beam structure adjacent the severed ends of the newly created car units in order to further reduce weight and to provide clearance, as required for trucks, whether single axle or double axle. The remaining structure need only retain adequate strength to withstand the intended loading requirements bearing in mind that because of the now shortened length of the center beam and preferably also because of new truck and suspension system locations, the center beam bending moments of each unit will be substantially reduced. In one preferred method wherein the FIG. 9 single axle trucks and suspension are added the previously described four wheel three-piece trucks located adjacent the ends of the original flatcar are removed and the severed ends of the original flatcar are shaped as required to provide clearance for and receive the FIG. 9 trucks. These trucks then may be connected at each end of each car unit, each axle with its pair of radius arms and elastomeric springs providing two laterally spaced support points at each end of each car unit as previously described. The newly created car units are then connected by a drawbar to form the two unit articulated flatcar described previously. In order to obtain even greater lading length capacity for the newly formed articulated flatcar in order to handle longer trailers, one car unit may be provided with an extension connected to the center beam in buff and draft force transmitting relationship. The extension also provides a connecting point for the drawbar system. Finally, the hitch associated with the rear car unit is remounted at a new location and, if desired to shorten the car's overall length, the front hitch could also be remounted. It will also be understood that the method may include the removal of substantial portions of the original car deck or platform since side or overhead lift-on/lift-off loading and unloading is anticipated.

Figure 6:
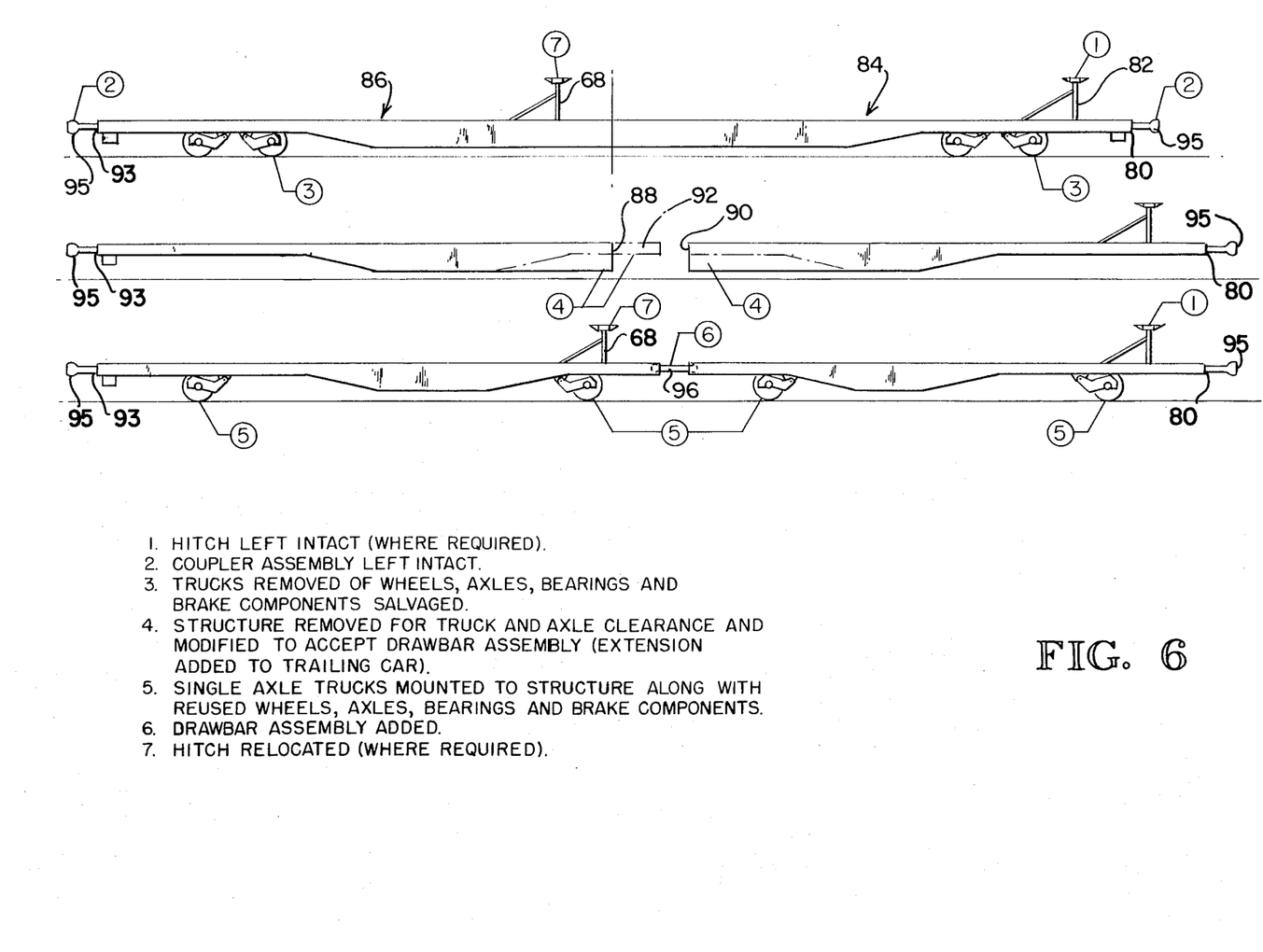
FIG. 6 is a side elevational schematic depicting one method for fabricating the FIG. 1 flatcar according to this invention.

Referring to the example depicted in FIG. 6, the fabrication of a two unit articulated intermodal flatcar from an 89 foot flatcar first requires that the flatcar be severed approximately 46 feet 8 inches from the striker 80, forming lead unit 84. The remaining 43 feet 4 inch section becomes the trailing unit 86. Units 84 and 86 now support hitches 82 and 68, respectively. Next, the center beam, a portion of which is now part of each unit, is tapered at its severed ends 88 and 90, sufficient to provide clearance for the trucks that are to be added. The trailing end of the lead unit center beam is modified for mounting drawbar buff/draft stops, not shown. A similar modification is made to the leading end of the trailing unit center beam and, additionally, an approximate 3 foot 4 inch extension 92 is added to the leading end of the trailing unit. In the example, the length of this extension is selected so that the overall length of the articulated, two unit flatcar will be approximately 96 feet over strikers 80 and 93, sufficient to carry two 45 foot trailers with nose mounted refrigeration units. Four FIG. 9 single axle trucks now are mounted to the ends of each unit at approximately 30 foot centers. This results in beam bending moments from vertical loads that are about 1/6th of the bending moment for a conventional 89 foot flatcar. Hitch 68 now is moved forward and remounted on the trailing unit 86 for proper trailer spacing. In the example, hitch 82 is left in place. Portions of the deck and center beam may be removed, as described above, for weight reduction. The coupler/cushioning assemblies 95 may be left intact at the outboard ends of each unit. Finally, a drawbar assembly 96 is connected between units. The foregoing method is adapted for use with either an 85 or 89 foot flatcar.

Figure 7:
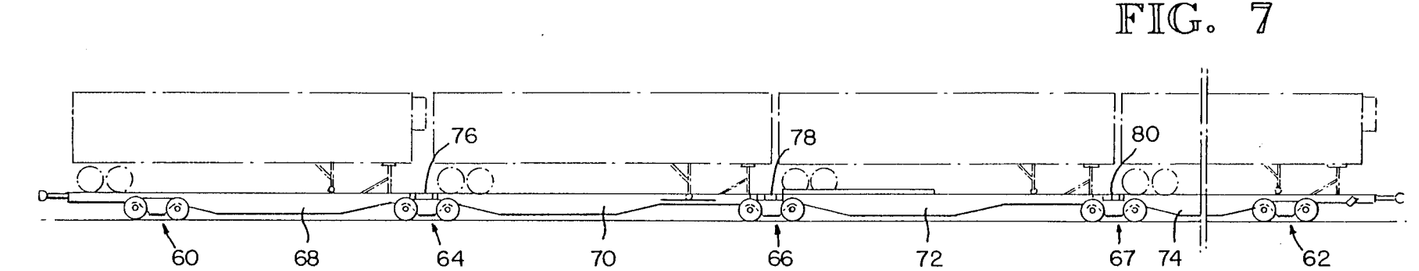
FIG. 7 is a side elevational view of a second preferred embodiment of a four unit articulated intermodal flatcar according to this invention, as adapted to carry four 45 foot trailers, two of which include nose mounted refrigeration units.
Figure 8:
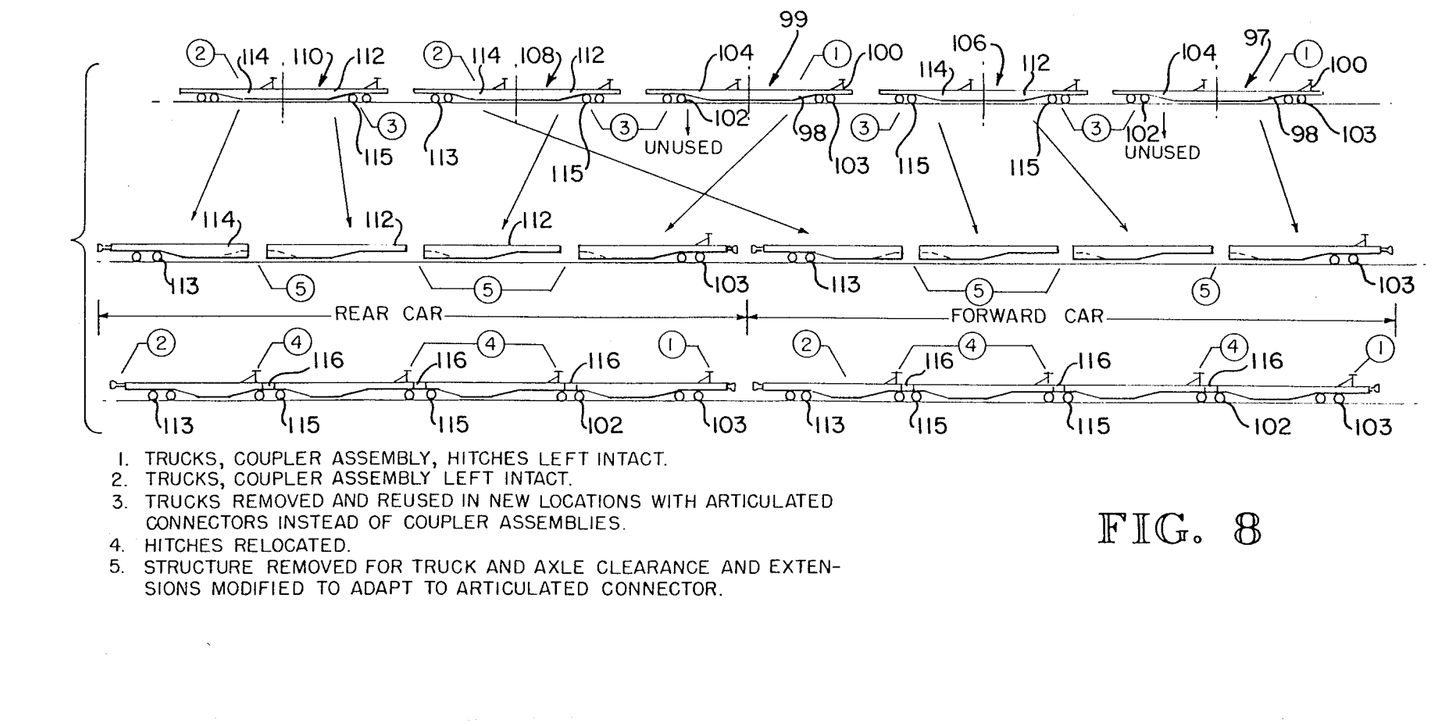
FIG. 8 is a side elevational schematic depicting one method for fabricating two FIG. 7 flatcars according to this invention.

Referring now to FIGS. 7 and 8, a second preferred embodiment of the articulated intermodal flatcar of this invention includes double axle trucks 60 and 62 at each end, and double axle trucks 64, 66 and 67 between and providing common support for adjacent ends of car units 68, 70, 72 and 74. All trucks 60, 62, 64, 66 and 67 are or may be of the three-piece construction described previously. In this example, the adjacent ends of the car units are supported and interconnected by articulated connectors 76,78 and 80 such as those manufactured by American Steel Foundries (ASF). These connectors are supported by and swiveled onto the center bowl of the underlying truck in a conventional manner. While the railcar illustrated includes only four units, it will be recognized that this railcar may include additional units and that, as the number of units is increased, the flatcar obtained becomes more economical to operate due to decreased weight per unit. This is because the number of trucks required is only one more than the number of units.

Two FIG. 7 flatcars may be fabricated from five 85 foot flatcars according to the method illustrated in FIG. 8. The lead unit 98 of each car is made by severing flatcars 97 and 99 at about 46 feet 3 inches from the striker. (This is beyond the transverse center lines of these cars). The forward hitch 100, about 4 feet 11 inches from the forward striker, may be left in position to provide clearance for a trailer having a nose mounted refrigeration unit. This also allows for use of the existing coupler/cushioning assembly and the standard bolster for the leading ends of units 98. The rear trucks 102 are salvaged from the remaining two 39 foot 5 inch sections 104, which are scrapped. Trucks 102 will be reused as will be described below. The forward trucks 103 are retained on their original mountings at the lead ends, as shown.

The center and trailing units are fabricated from the remaining three flat cars 106,108 and 110 by first severing these cars at their transverse center lines to form three pairs of center and trailing units 112 and 114. The rear unit 114 of car 108 becomes the trailing unit of the forward car, and the rear unit 114 of car 110 becomes the trailing unit of the rear car, as shown. Rear trucks 113 and rear coupler assemblies (not shown) are retained in their original mountings at the trailing ends. Appropriate end or center beam or sill structure is removed as necessary to provide clearance for the remaining trucks. Trucks 115 and 102 are now relocated between units to provide common support therefor as illustrated. These trucks mount articulated connectors 116 which swivellably connect adjacent ends of the units. Next, the hitches are relocated to accomodate 45 foot trailers. Portions of the deck may be removed at this time in order to reduce weight as described above.

It will be recognized that container mounts may be added in place of or in combination with hitches in either example described above if containerized cargo carrying capacity is desired. In this case, inner portions of the deck still may be removed to reduce weight, with the side sills and the outer periphery of the deck left intact in order to support the corners of short containers and to retain the amount of transverse beam stiffness required under such load conditions.

The flatcar of this invention may be fabricated by still another, but less desirable, method not illustrated. This method requires that the midsection of either an 85 foot or 89 foot flatcar be removed and scrapped. The severed end sections of this flatcar are then spliced together, leaving the draft gear, couplers and double axle trucks intact. Either of the previously mentioned truck systems could be applied to this method. This method is less desirable than those previously described because it fails to achieve any significant weight savings and requires twice as many original flatcars.

With this invention, it is now possible to provide articulated intermodal flatcars capable of carrying 45 foot or larger trailers, containers, or both, through a new and unobvious method of fabrication which utilizes and effectively revitalizes potentially obsolete 85 foot or 89 foot flatcars. This method therefore offers substantial structural and economic advantages which are not attainable by other fabrication techniques and, as a result, offers the railroad industry a viable alternative to all-new cars by which it can re-equip to meet current needs.

While several preferred embodiments of the invention have been illustrated and described herein, variations will become apparent to one of ordinary skill in the art. Accordingly, the invention is not to be limited to the specific embodiments illustrated and described herein, and the true scope and spirit of the invention are to be determined by reference to the appended claims.

The embodiments of the invention in which an exclusive property or privilege is claimed are defined as follows:

1. At least one short railway car unit manufactured by converting a long railway car having a center beam structure and a deck according to a process comprising the steps of:
   (a) transversely severing said long railway car to form at least one car section having a center beam structure and a deck;
   (b) removing portions of the center beam structure of said at least one section adjacent the end that severance was effected;
   (c) removing portions of the deck of said at least one section between its ends to form a reduced section of decreased weight but having at least the combined load strength of said long railway car; and
   (d) mounting a truck to said at least one reduced section adjacent the removed center beam portions of said at least one section to form at least one short railway car unit.

2. The railway car unit of claim 1 manufactured by the process further including the step of extending the length of the center beam of said at least one section.

3. The railway car unit of claim 1 wherein said truck mounting step of said manufacturing process includes the step of mounting said truck to provide two suspension points being transversely spaced apart adjacent one end of said section.

4. The railway car unit of claim 1 wherein said truck mounting step of said manufacturing process includes the step of mounting said truck to provide a point of suspension adjacent one end of said section.

5. The railway car unit of claim 1 wherein said long railway car includes at least one double-axle truck and wherein said truck mounting step of said manufacturing process includes the step of mounting said at least one double-axle truck on said at least one section.

6. The railway car unit of claim 1 wherein said truck mounting step of said manufacturing process includes the step of mounting a single-axle truck on said at least one section.

7. The railway car unit of claim 1 wherein said truck mounting step of said manufacturing process includes the step of mounting said truck inside a load point of said at least one section.

8. Short railway car units articulated together end-to-end, that are manufactured by converting a long railway car having a center beam structure and a deck according to a process comprising the steps of:
   (a) transversely severing said long railway car to form car sections each having a center beam structure and a deck;
   (b) removing portions of the center beam structure of each of said section adjacent the ends at which severance was effected to provide clearance for trucks;
   (c) removing portions of the deck of said sections between their ends to form reduced sections of decreased weights but having at least the combined load strength of said long railway car;
   (d) mounting trucks to said reduced sections adjacent the removed center beam portions to form short railway car units; and
   (e) swivelably connecting said short railway car units end-to-end.

9. The railway car units of claim 8, wherein said truck mounting step of said manufacturing process includes the step of mounting said trucks to provide four points of suspension per each of said short railway car units, two suspension points being transversely spaced apart adjacent one end of each said unit and the other two suspension points being transversely spaced apart adjacent the other end of each of said short railway car units.

10. The railway car units of claim 8, wherein said truck mounting step of said manufacturing process includes the step of mounting said trucks to provide at least three points of suspension per each of said short railway car units, two suspension points being transversely spaced apart adjacent one end of each said unit and at least one other suspension point being adjacent the other end of each of said short railway car units.

11. The railway car units of claim 8, wherein said long railway car includes at least one double axle truck and wherein said truck mounting step of said manufacturing process includes the step of mounting said at least one double axle truck on at least one of said sections.

12. The railway car units of claim 8 wherein said truck mounting step of said manufacturing process includes the step of mounting single-axle trucks.

13. The railway car units of claim 8 wherein said truck mounting step of said manufacturing process includes the step of mounting said trucks inside the load points of said sections.

14. The railway car units of claim 8, wherein the long railway car is a flatcar.

15. The railway car units of claim 14, manufactured by the process further comprising the step of extending the length of the center beam of at least one of said sections.

16. A method of converting a long railway car having a center beam structure and a deck into at least one short railway car unit, comprising the steps of:
    (a) transversely severing said long railway car to form at least one short car section having a center beam structure and a deck;
    (b) removing portions of the center beam structure of said at least one section adjacent the end at which severance was effected to provide truck clearance;
    (c) removing portions of the deck of said at least one section between its ends to decrease the weight of said at least one section while retaining at least the combined load strength of said long railway car; and
    (d) mounting at least one truck to said at least one section adjacent to the removed center beam structure portions to form at least one short railway car unit.

17. The method of claim 16, further comprising the step of extending the length of said at least one section.

18. The method of claim 16, wherein said truck mounting step includes the step of mounting said at least one truck to provide two suspension points transversely spaced apart adjacent one end of said at least one section.

19. The method of claim 16 wherein said truck mounting step includes the step of mounting said at least one truck to provide a suspension point mounted adjacent one end of said at least one section.

20. The method of claim 16 wherein said long railway car includes at least one double axle truck and wherein said truck mounting step includes the step of mounting said at least one double axle truck on said at least one section.

21. The method of claim 16 wherein said truck mounting step includes the step of mounting at least one double axle truck.

22. The method of claim 16 wherein said truck mounting step includes the step of mounting said truck inside at least one load point of said at least one section.

23. A method of converting a long railway car having a center beam structure and a deck into short railway car units articulated together end-to-end, comprising the steps of:
    (a) transversely severing said long railway car to form short car sections each having a center beam structure and a deck;
    (b) removing portions of the center beam structure of each of said sections adjacent the ends at which severance was effected to provide clearance for trucks;
    (c) removing portions of the deck of each of said sections between their ends to decrease the weights of said sections while retaining at least the combined load strength of said long railway car;
    (d) mounting trucks to said sections adjacent the removed center beam structure portions to form said short railway car units; and
    (e) connecting said short railway car units end-to-end swivelably.

24. The method of claim 23, wherein said truck mounting step includes the step of mounting said trucks to provide four points of suspension per each of said short railway car units, two suspension points being transverely spaced apart adjacent one end of each said units and the other two suspension points being transversely spaced apart adjacent the other end of each of said short railway car units.

25. The method of claim 23, wherein said truck mounting step includes the step of mounting said trucks to provide at least three points of suspension per each of said short railway car section, two suspension points being transversely spaced apart adjacent one end of each said unit and the other suspension point being mounted adjacent the other end of each of said short railway car units.

26. The method of claim 23, wherein said long railway car includes at least one double axle truck and wherein said truck mounting step includes the step of mounting said at least one double axle truck on at least one of said sections.

27. The method of claim 23 wherein said truck mounting step includes the step of mounting single-axle trucks on said sections.

28. The method of claim 23, wherein said truck mounting step includes the step of mounting said trucks inside the load points of said sections.

29. The method of claim 23, wherein the long railway car is a flatcar.

30. The method of claim 29, further comprising the step of extending the length of the center beam structure of at least one of said sections.

* * * * *